Figure 1:
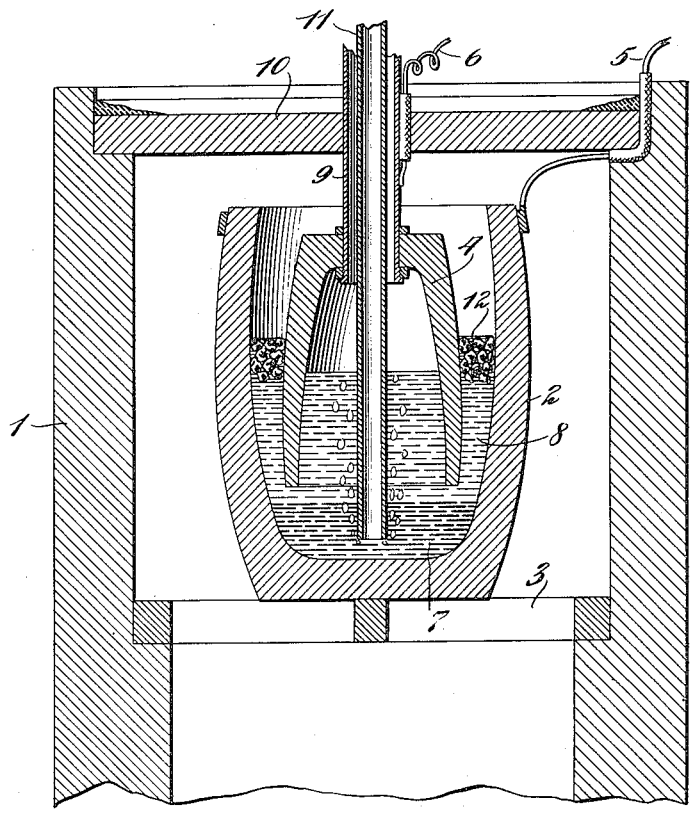

C. E. ACKER.
ECONOMIC METHOD OF OBTAINING GASES.
APPLICATION FILED MAY 16, 1911.

1,050,902.

Patented Jan. 21, 1913.

C. E. ACKER.
ECONOMIC METHOD OF OBTAINING GASES.
APPLICATION FILED MAY 16, 1911.
1,050,902.
Patented Jan. 21, 1913.
2 SHEETS—SHEET 2.
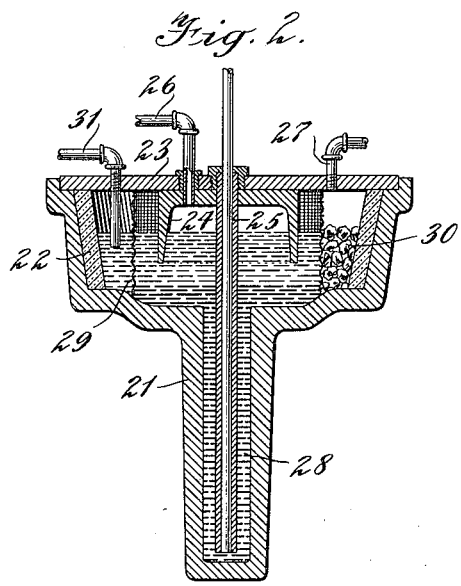
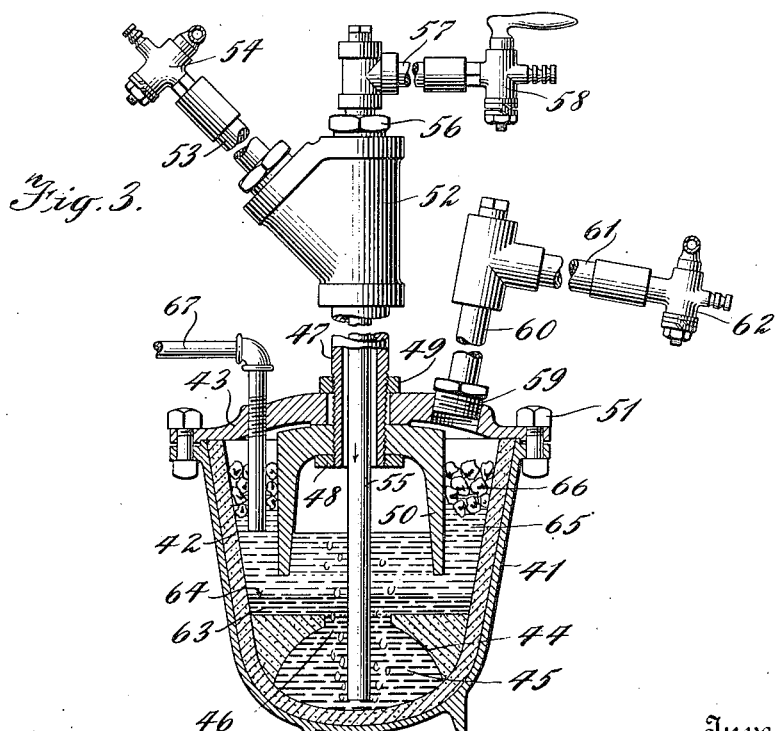

UNITED STATES PATENT OFFICE.

CHARLES E. ACKER, OF OSSINING, NEW YORK, ASSIGNOR TO THE NITROGEN COMPANY, A CORPORATION OF NEW YORK.

ECONOMIC METHOD OF OBTAINING GASES.

1,050,902.

Specification of Letters Patent.  Patented Jan. 21, 1913.

Application filed May 16, 1911. Serial No. 627,520.

*To all whom it may concern:*

Be it known that I, CHARLES E. ACKER, a citizen of the United States, residing at Ossining, in the county of Westchester and State of New York, have invented certain new and useful Improvements in Economic Methods of Obtaining Gases, of which the following is a full, clear, and exact description.

This invention relates to the continuous separation of gases from gaseous mixtures and from liquids or solids containing them. It is adapted to the production of nitrogen from atmospheric air and in certain of its aspects may be regarded as being related indirectly to the process described in my companion application, Serial No. 580,191, filed September 2, 1910, and entitled "Process of obtaining nitrogen", which application has now become Patent No. 999,033, issued July 25, 1911. It is also adapted to the continuous production of hydrogen through the decomposition of steam or water.

In the production of nitrogen, the present process, like the former, aims to produce gas in such condition as to be immediately ready for use in the manufacture of nitrogen compounds, such for example as cyanids and cyanamids. I have discussed in my said companion application several processes heretofore in use and have pointed out some of their objectionable characteristics and features. I also therein disclosed a novel method of producing nitrogen through the instrumentality of a non-metallic fluid, such as sodium cyanid, which is capable of taking up oxygen and which may thereafter be deprived of the oxygen taken up by combining it with carbon to form CO or $CO_2$ gases, the preferred fluid in this former case being a fused salt, to wit, sodium cyanid.

In producing nitrogen by the so-called "copper method" the oxygen is extracted from atmospheric air by passing the latter over red hot copper. Copper oxid is thus produced which is subsequently reduced to metal by means of carbonaceous gases. The copper may not be employed in molten condition because of its very high melting point,—1070° C. When the air is first brought into contact with the fresh, clean surface of the red hot copper its oxygen is greedily absorbed, and the surface of the copper immediately becomes tarnished and finally covered with a gray coating or layer of copper oxid which may comprise only a very small part by weight of the mass of copper, but thereafter more or less completely prevents access of the air to the unoxidized metal below, whereupon it quickly becomes impossible to produce pure nitrogen except at an abnormally slow rate. Thus, after the first superficial film of oxid is formed on the surface of the copper the action slows down and only a small percentage of the total weight of copper is able to perform its function; large quantities of the metal being therefore required to economically produce a small quantity of nitrogen. After the superficial layer of oxid of copper is produced, the supply of air must be shut off and the production of nitrogen discontinued so that the mass of metal and adhering oxid may be subjected *in situ* to the reducing action of suitable gases which have to be made for the purpose, since no solid reducing agent such as coal may be employed. Obviously, the carbon in coal is less expensive than the available carbon contained in producer gas made from the same coal, if the coal may be used directly and without special treatment. It is, of course, impracticable to remove by physical or mechanical means the film or layer of oxidized copper from the mass of unoxidized copper so that it may be separately and continuously reduced, and its metal made available for reuse.

I now disclose a process for making nitrogen from air in which the oxygen of the air must always come into contact with a clean, bright, untarnished metallic fluid, instead of a non-metallic fluid, as in my companion application, and combines therewith to form an oxid which immediately and continuously removes itself, thus permitting the continuous and very rapid production of pure nitrogen, and at an equally rapid rate after the apparatus has been in use several days to the rate at the beginning of the operation, the result being effected furthermore, without permitting the accumulation, in the meantime, of a large quantity of oxid which has to be subsequently or intermittently reduced. While the nitrogen is being produced in my present process there is always a certain limited percentage of oxid in process of reduction, but this percentage is small and substantially constant, and the reduced metal may be, and preferably is, continuously returned to the process. The materials employed are less expensive than those employed in my previously described process, and there are certain other advantages which will be hereinafter referred to.

In the accompanying drawings, which form a part hereof, are exemplified suitable forms of apparatus for effecting the economic process in question.

Figure 1 shows a simple form of such apparatus consisting essentially of two Dixon graphite-clay crucibles such as are used for melting steel, copper, etc., or crucibles of Battersea, Colorado, or French clay, or of any suitable refractory material. Fig. 2 shows a modified form of the same; and Fig. 3 exemplifies another and preferred form of apparatus.

Referring to Fig. 1, the furnace 1, therein shown, incloses a large pot or crucible 2, which may rest upon a suitable grating 3. Within the crucible 1 is a smaller and inverted crucible, or bell 4 which serves to collect the gas evolved or freed. The furnace may be of any suitable construction and may be fired with coal or gas, or it may be of the electrical resistance type. I prefer to heat the charge contained in the larger crucible by passing an alternating current therethrough, suitable terminals 5 and 6 being respectively provided for the container and its bell; the contents of the crucible 2 in such case constituting the resistance material through which the current is passed in sufficient quantity to produce the desired temperature. A quantity of suitable metal 7, preferably lead, is placed in the outer crucible or container to a depth of several inches, and this is covered with a layer 8 of a molten salt or oxid, which will be hereinafter referred to more specifically, so that the container is from one half to three fourths full. The inverted crucible or bell 4 is submerged in the molten salt to a point where its lower edge reaches within an inch or so of the surface of the molten metal 7; and is provided with a vent or exhaust pipe 9, preferably of relatively large diameter which leads upwardly from the interior of the bell, through the roof or top thereof and through the cover 10 of the furnace. The connection between this pipe and the bell is gas tight, and the gas delivered through said pipe may be collected in any suitable manner. Extending downwardly through the large exhaust pipe and into the molten metal bath is a smaller air inlet pipe 11 which may be of the same material as the crucibles.

Outside of the bell and upon the surface of the molten salt is a layer of coal, coke or charcoal 12.

The modified form of apparatus shown in Fig. 2 comprises a suitable metal receptacle 21 with a lining 22 therein, which may be of carbon, or of some suitable refractory material such as graphite, clay, etc., a cover 23, a bell 24, air tube 25, gas vent or exhaust pipt 26, and carbon dioxid exhaust pipe 27, similar to the corresponding parts in the previously described apparatus. The air tube in this instance, however, extends down into a deep pocket or well in the bottom of the receptacle so as to afford a considerable length of travel for the air or its constituents through the lead or other suitable metal 28 in the bottom of the receptacle, to thereby insure the complete absorption of the oxygen while the air is passing in at a rapid rate, and while reducing the quantity of lead employed to a minimum. A perforated refractory screen 29 surrounds the bell. Between screen 29 and the carbon or refractory lining, coal 30 may be introduced, the constituents of which will serve as the principal reducing agents. If desired, however, a suitable tube or pipe 31 may be provided through which oil, producer gas, water gas, etc., may be introduced to serve either as auxiliary reducing means to the coal, or they may even be used wholly in lieu of the solid coal or carbon. If soft coal be used as the source of carbon, some hydrogen gas will be given off during the course of the process; but as hydrogen will itself reduce the metallic oxid formed during the course of the operation, its presence is advantageous, instead of being, as in the case of the cyanid-cyanate bath mentioned in my said companion application, a disadvantage.

In Fig. 3, which exemplifies a preferred form of apparatus, a suitable receptacle or pot 41, of cast iron, for example, is preferably lined, as at 42 with graphitized carbon, graphite and clay, or other suitable refractory material, and is provided with a cover 43 adapted to make air tight closure with the receptacle. In the bottom of the receptacle is a transverse septum or partition 44 of suitable insoluble or refractory material adapted to form a bell shaped central chamber 45, which latter however is in communication with the space above the partition by means of the central opening 46 in said partition. A pipe 47 extends through an aperture in the cover and carries the collars 48 and 49 and a bell 50, the latter being preferably of graphite and clay crucible material, or of graphitized carbon; the cover and bell being clamped together between the two collars, and the cover being drawn into air tight engagement with the receptacle by means of bolts 51. The bell preferably extends downwardly some distance into the receptacle and serves to collect the nitrogen, if that be the gas produced, which bubbles or blows up thereinto during the course of the operation; the pipe 47 being of relatively large diameter and being connected at its upper extremity with a Y connection 52, the oblique arm of which is in turn connected to a pipe 53, preferably provided with a cock or valve 54 of any suitable type. Downwardly extending through pipe 47 and connection 52, is an air inlet pipe 55 which may be secured in the upper extremity of the Y as at 56. Pipe 55 is of relatively small diameter and may be made of graphitized carbon, graphite and clay, or any suitable refractory material, or it may be made of steel or iron, for example, if it is covered and lined with refractory material to protect it from the molten mass. It extends down well into, but not to the bottom of the chamber 45, and receives air from a pipe 57 to which it is suitably connected; pipe 57 being provided with a cock 58 so that the admission of air may be controlled to a nicety. On one side of the cover 3 is a vent 59 in which is securely held the extremity of a carbon di-oxid exhaust pipe 60 which latter delivers into a pipe 61, which may also be provided with a valve or cock 62.

In operation the receptacle is filled with, for example, molten lead 63, to a line 64, which is below the bottom of the inverted cup or bell 50. This molten lead is oxidized during the process as hereinafter explained and yields one or more of the oxids of lead,— but principally lead monoxid, litharge. Superposed upon the mass of molten metal is a molten non-metallic bath 65 of sufficient depth to effectively seal the lower edge of the bell 50, composed of one or more oxids of the metal employed in the bottom of the apparatus, e. g. lead oxid, or of one or more oxids or salts of other metals, which are fusible and fluid at a temperature which may be economically obtained and maintained in the apparatus, and with which the lead oxid is miscible, or in which it will become suspended or dissolved, so that while so suspended or dissolved, it may diffuse or be transported from the point where it enters the molten mass to another part of the apparatus in fluid communication therewith through the medium of the molten bath, and where it may then come into contact with carbon or other reducing agents which will reduce the oxid and make the metal immediately available for reuse. The melting point of lead oxid itself is about 954° C., (Hofman,—*The Metallurgy of Lead*) and if it were alone employed in molten condition to seal the bell,— that is, without the addition of other more fusible oxids or salts, the working temperature of the apparatus would have to be maintained at about 1000° C. in order to insure sufficient fluidity of the melt to effectively seal the bell, and to permit the molten litharge to flow freely into the adjoining compartment where it could be continuously reduced. The abnormal temperature required to melt the oxid alone and to keep it fluid, and its well known fluxing and oxidizing properties would prove very destructive to the apparatus. It would be impossible to make the bell of graphite, or of clay and graphite crucible material, or of any metal. Cast iron containing vessels heated externally would last but a short time; volatilization of both lead and litharge would be excessive, facilitated, as it would be, by the current of escaping gases from each compartment; and the consumption of fuel required to maintain such a temperature would be excessive and uneconomical. Even though molten lead oxid or any reducible oxid might through the development of suitable apparatus be economically employed to seal the bell it should, of course, be maintained at a certain minimum depth on the surface of the lead, and therefore the quantity of coal or other reducing agent in contact with the molten mass would always have to be carefully limited, as otherwise the reduction of the litharge would take place very rapidly and would go on until there was nothing left to seal the bell. It therefore becomes necessary under existing conditions and from an economical and practicable standpoint, to employ a more fusible and less corrosive material than molten lead oxid as the principal constituent of the bath, and I prefer at the same time to employ a material which, while miscible or fusible with lead oxid, will not itself be reduced by carbon and will itself effectively seal the bell at all times even though all of the litharge produced may be reduced to metal. There are a number of simple salts and oxids which will perform this function, including, for instance, molten alkali metal haloids, (e. g., chlorids, bromids, fluorids, carbonates, borates, plumbates, boron tri-oxid, etc. Chlorids of sodium and potassium each have sufficiently low melting points to enable the apparatus to be worked continuously at a temperature of about 800° C., but a mixture of the two chlorids is preferable and much more satisfactory because it remains molten and thinly fluid at a temperature considerably lower than 800° C., and this is a factor of great importance in the life of the apparatus. The alkali metal carbonates when used singly have melting points which are too high for long continued and economical working, and require considerable fuel to maintain the bath molten and sufficiently fluid. A mixture comprising both sodium and potassium carbonates, however, melts at a lower temperature than either carbonate alone, and is therefore better adapted for use in the process. Sodium biborate (common borax) melts easily but is not sufficiently fluid at even 900° C., and the same is true of boron tri-oxid. I have employed mixtures of borax, boron tri-oxid, sodium plumbate, etc., with alkali metal chlorids, fluorids, and carbonates. I have also used as component parts of the bath mixtures of fluorids comprising 100 parts of cryolite and 50 to 100 parts of aluminum fluorid, which are fusible and thinly fluid at a medium red heat,—below 800° C. It is practically essential, whatever the composition of the bath may be, that in addition to having a low melting point,—preferably below 800° C.,—together with sufficient fluidity at that temperature, that none of its constituents, under the normal working conditions of the process, shall be volatile, or subject to change into something unduly volatile, infusible, or insoluble in the other constituents of the bath, or which will in practice render the bath pasty or worthless, or will act destructively on the apparatus. I find, in order to fulfil these conditions, that the bath preferably should be composed substantially of compounds of the alkali metals, and that the alkali metal chlorids and carbonates, particularly those of sodium and potassium, are most suitable for the purpose. The alkaline metal carbonates may be partially converted, at a red heat, in the presence of hydrogen or moisture likely to be found in reducing agents, such as coal, charcoal, etc., or when steam is employed in making hydrogen, as hereinafter explained, into the very easily fusible alkali hydrates; but such partial conversion is of no disadvantage, and indeed, if the hydrate is formed at all, it will ordinarily be reconverted into carbonates. There may also be more or less alkali metal plumbates produced, which will do no harm. If the molten bath comprised alkaline earth metal chlorids, however, such as calcium chlorid, which would lower the melting point and increase the fluidity of many other salts which might be used, such contact with moisture or hydrogen at a red heat would soon make the bath basic and difficultly fusible through the production of the infusible calcium oxid. I hence prefer to employ a bath consisting of a mixture of alkali metal chlorids and alkali metal carbonates, in the proportion of 20% to 80% of the former and 80% to 20% of the latter; and have used numerous mixtures included within these limits and find them satisfactory in all respects. When they are used the bath may be maintained molten and thinly fluid at a dark red heat. By the expression "alkali metal chlorids" I mean to include either sodium, potassium or lithium chlorid alone, or any mixture thereof, and by the expression "alkali metal carbonates" I mean to include either sodium, potassium or lithium carbonate alone, or any mixture thereof. I prefer to employ the sodium and potassium compounds because of their cheapness. While great latitude in the exact percentage of either constituent of the above mixture of alkali metal compounds is thus permissible, I have found that a bath composed of 100 parts of sodium chlorid, 100 parts of sodium carbonate and 75 parts of potassium chlorid is about as satisfactory a mixture as may be desired.

Assuming now that the receptacle contains its content of molten lead and solvent and that the temperature of the fluids has been raised to approximately a red heat. Air is then forced through the tube 55 in suitable quantities and bubbles or blows out of the lower extremity thereof into the molten lead. Immediately the lead commences to oxidize and the lead oxid (litharge) floats up into contact with the supernatant bath of molten alkali metal compounds, while the nitrogen content of the air passes up through the molten mass and is collected under the bell from whence it escapes through the pipes 47 and 53. The molten solvent is of course considerably agitated and stirred up by the nitrogen which passes through it. This is important in itself, since it tends to facilitate the solution of the oxid and to make the melt homogeneous. The molten solvent serves as a vehicle to transport the lead oxid from the central part of the receptacle through which the nitrogen is ascending, to the sides of the pot where, in the compartment formed between the outer walls of the bell and the graphitized carbon lining 42, the lead oxid comes into contact with suspended or floating coal 66, such as anthracite, coke, soft coal or charcoal, and is reduced by the carbon, forming metallic lead which settles down into the bath of lead 63 and is continuously (or intermittently) reused. Simultaneously a gas is liberated on the surface of the coal or in the vicinity thereof, which is substantially carbon dioxid ($CO_2$) and which escapes through the pipe 60. The graphite does not reduce the lead oxid at the temperature of the operation and this fact is of very great importance as otherwise this valuable material of construction would be out of the question. There is hence provided a free circulation or diffusion of the molten salts while the said salt seals the nitrogen compartment in the bell from the carbon dioxid compartment and prevents mixing of the pure nitrogen and carbon dioxid. The nitrogen is usually delivered from pipe 53 into a receiver under some pressure and this results in depressing the level of the melt in the bell and raising it outside thereof. Of course, the air is only admitted into contact with the molten lead in just sufficient quantities to enable the latter to take up all of the oxygen content of the former, so that substantially pure nitrogen is delivered through tube 53. The lead oxid colors the white mixture of the preferred salts yellow, and the depth of this color is a measure to some extent of the amount of oxid dissolved. It also slightly raises the melting point of the mixture, but if the volume or exposed surface of the coal is sufficiently large, the lead oxid is reduced so fast that the color is hardly noticeable, and the bath is very fluid. If natural gas, water gas, producer gas, oil, hydrogen, or the like, are used to reduce the metallic oxid and to thereby enable the free metal, i. e. lead to be repeatedly used in the process, they may be injected into the oxid bearing melt through pipe 67, or may even be passed over the surface thereof, care being taken of course to confine such gas to the reducing compartment. When the metal used is molten lead, which is the preferred oxidizable material, it is inadvisable to expose any iron to the "melt" since iron reduces litharge with avidity. It is for this reason that the sides of the pot or receptacle are lined in the manner described and the air inlet tube, if of iron, is carefully covered and lined with refractory material. This tube may, however, be made of graphite, or of a combined silicate such as is used in making high grade clay crucibles, i. e. Battersea, Colorado, Beaufray, etc., such materials not being much affected by either red hot lead or by the salt mixture. Of course when a fluorid bath or mixture, such as that above referred to, is used, these clays would not be available for the purposes in question.

In general it will be observed that the process above described differs from that set forth in my companion application aforesaid in several respects, but principally in that the body of molten salts, while still serving as a vehicle to carry oxygen from one compartment to another, is not itself alternately oxidized and reduced, but that its function in this case is to dissolve and transport another substance,—litharge,—or some other oxid, from one compartment to another, the transfer being accomplished by diffusion, or by agitation or circulation of the molten menstruum.

Obviously while the steps of the process may be conducted in separate receptacles, I prefer to conduct it in the manner above described.

Aside from the cheapness of the materials used, and their stability when subjected to such impurities as are found in raw coal containing moisture, hydrogen, etc., and differing in this respect from the cyanid-cyanate process disclosed in my companion application aforesaid, the present improvement is valuable because the escaping gas resulting from the reduction of the dissolved oxid is substantially $CO_2$ alone, whereas in the said former process it was a mixture of $CO_2$ and CO, the carbon monoxid constituting a large percentage of the mixture. If the escaping gas is all, or practically all, $CO_2$ as against straight CO, only one half as much coal will be consumed, and theoretically, 12 parts of carbon will combine with 32 parts of oxygen contained in about 152 parts of air, thus freeing 120 parts of nitrogen from such air. Water gas rich in hydrogen affords an excellent reducing agent since 4 parts of hydrogen will do the work of 12 parts of carbon. The hydrogen in fuel oil, instead of being a disadvantage, as in the cyanid-cyanate method, herein burns to $H_2O$, very advantageously and can do no harm.

While I prefer to use lead as the oxidizable material herein, other substances may be employed, such for example as zinc, antimony, or tin; these metals are themselves readily fusible at the temperature of the operation. Iron may be employed in the form of shavings or powder in the bottom of the receptacle, and the oxid will be transported in the usual manner to the carbon and will be reduced by the carbon, but the reduced iron has a tendency to adhere to the solid surface of the coal, which is a disadvantage. If a gas is employed as reducing agent this difficulty disappears to a large extent. Any substance, which has a strong affinity for oxygen when immersed or contained in the fusible bath, may be employed,—provided that its resulting compound,—oxid or higher oxid will be dissolved in the bath or transported by the bath to the reducing coal, and provided that it is readily reducible by carbon or the equivalent thereof under the conditions of operation.

I have found that hydrogen gas may be economically produced in the process instead of nitrogen when tin or zinc is employed as the oxidizable metal and water or steam, preferably the latter, of course, is injected thereinto instead of air. The red hot metal decomposes the water into hydrogen, which escapes in the same manner that nitrogen does in the process heretofore described, and oxygen which combines with the metal to form an oxid. The oxid passes to the reducing compartment and comes into contact with coal, for example, which reduces it, and returns the metal to the process as previously described.

Having described my invention, I claim:

1. The process of obtaining a gaseous element from a fluid containing oxygen as one of the constituents thereof, which comprises reacting upon a heated mass of metal, having a strong affinity for oxygen, with the oxygen content of a quantity of said fluid, separating the element sought from the compound so formed, disseminating said compound through a mass of liquid conveying medium having characteristics different from those of said compound, conveying said compound through the instrumentality of said medium to points relatively remote from where said gaseous element is being separated in manner aforesaid, and reacting at said remote points upon said compound with a reducing reagent to reform the metal.

2. The process of obtaining a gaseous element from a fluid containing oxygen as one of the constituents thereof which comprises reacting upon a heated mass of metal, having a strong affinity for oxygen, with the oxygen content of a quantity of said fluid, separating the element sought from the compound so formed, disseminating said compound through a liquid mass comprising a mixture of alkali metal salts, and regenerating the oxidized metal by means of a reducing reagent having a strong affinity for oxygen.

3. The process of obtaining a gaseous element from a fluid containing oxygen as one of the constituents thereof which comprises reacting upon a heated mass of metal, having a strong affinity for oxygen, with the oxygen content of a quantity of said fluid, separating the element sought from the compound so formed, disseminating said compound through a liquid mass comprising an alkali-metal compound, and regenerating the oxidized metal by means of a reducing reagent having a strong affinity for oxygen.

4. The process of obtaining a gaseous element from a fluid containing oxygen as one of the constituents thereof which comprises reacting with the oxygen content of a quantity of said fluid upon a molten substance having a strong affinity for oxygen, separating the element sought from the compound so formed, disseminating said compound through a mass of a liquid conveying medium having characteristics different from those of said compound, and reacting on said compound while in said medium with a reducing reagent to reform the molten substance.

5. The process of obtaining a gaseous element from a fluid containing oxygen as one of the constituents thereof which comprises reacting upon a molten metal, having a strong affinity for oxygen, with the oxygen content of a quantity of said fluid, separating the element sought from the compound so formed, disseminating said compound through a mass of liquid conveying medium having characteristics different from those of said compound, and reacting on said compound while in said medium with a reducing reagent to reform the metal.

6. The process of obtaining a gaseous element from a fluid containing oxygen as one of the constituents thereof which comprises reacting upon a molten metal, having a strong affinity for oxygen, with the oxygen content of a quantity of said fluid, separating the element sought from the compound so formed, dissolving said compound in a mass of liquid conveying medium having characteristics different from those of said compound, and reacting on said compound while in solution with a reducing reagent to reform the metal.

7. The process of obtaining a gaseous element from a fluid containing oxygen as one of the constituents thereof which comprises reacting upon a molten metal with the oxygen content of a quantity of said fluid, separating the element sought from the metallic compound so formed, dissolving said compound in a menstruum comprising an alkali metal compound, and reacting on the metallic compound aforesaid with a reducing reagent to reform the metal.

8. The process of obtaining a gaseous element from a fluid containing oxygen as one of the constituents thereof which comprises reacting upon a molten metal with the oxygen content of a quantity of said fluid, separating the element sought from the metallic compound so formed, dissolving said compound in a menstruum comprising an alkali metal compound, and reacting on the metallic compound aforesaid with a carbonaceous reducing reagent to reform the metal.

9. The process of obtaining a gaseous element from a fluid containing oxygen as one of the constituents thereof which comprises reacting upon a molten metal with the oxygen content of a quantity of said fluid, separating the element sought from the oxid so formed, dissolving said oxid in a menstruum comprising an alkali metal haloid, and liberating the metal from the dissolved oxid thereof by reacting on the latter with a reducing reagent having a strong affinity for oxygen.

10. The process of obtaining a gaseous element from a fluid containing oxygen as one of the constituents thereof which comprises subjecting said fluid to contact with a molten bath comprising a mass of metal having a strong affinity for oxygen, at one portion of said bath, combining substantially the entire oxygen content of said fluid with said bath, separating the element sought from the compound so formed, and treating said bath, at another portion thereof, with a reagent to eliminate the so combined oxygen therefrom and to liberate the so combined metal.

11. The cyclic process of obtaining nitrogen from the air which comprises bringing a quantity of air into intimate contact with a molten metal which has a strong affinity for oxygen, combining the entire oxygen content of such air with said metal to form a substance of less density than the metal, separating the nitrogenous residue therefrom, dissolving the said substance in a menstruum for the same, and reacting on the solution with a reagent capable of combining with oxygen to reform the metal.

12. The cyclic process of obtaining nitrogen from the air which comprises reacting on the oxygen content of a quantity of air with a molten metallic reagent capable of combining with the oxygen of the air, separating the gaseous nitrogenous residue from the compound so formed, dissolving said substance in a superposed body of menstruum for the same, said menstruum having characteristics different from those of said compound, and reacting on the solution with a substance capable of combining with oxygen, to reform the metallic reagent.

13. The cyclic process of obtaining nitrogen which comprises treating a substance which contains nitrogen and oxygen with a simple elementary substance capable of vigorously reacting with oxygen, separating the gaseous nitrogenous residue from the resultant compound, dissolving said compound in a menstruum for the same, said menstruum having characteristics different from those of said compound, and reacting on the solution with a reagent capable of combining with oxygen, to reform the elementary substance.

14. The process of obtaining nitrogen which comprises directing a current of air into contact with a bath of molten metal having a strong affinity for oxygen, combining the oxygen content of the air with said metal to form an oxygen compound of less density than the molten metal, the residual nitrogen being unacted upon, rendering said compound fluid at a temperature below 950° C., and reacting thereon with a reagent capable of readily reacting therewith to form a gaseous compound and to reform the metal, the residual nitrogen aforesaid being maintained separate from said gaseous compound.

15. The process of obtaining nitrogen which comprises subjecting a substance which contains nitrogen and oxygen to contact with a molten metal having a strong affinity for oxygen, separating and collecting the nitrogenous residue from the compound so formed, dissolving said compound in a menstruum for the same, said menstruum being a substance other than said compound, and treating portions of the solution with a reagent capable of eliminating the so combined oxygen therefrom and liberating the said metal.

16. The process of obtaining nitrogen which comprises subjecting a substance which contains nitrogen and oxygen to contact with a molten bath comprising a mass of metal having a strong affinity for oxygen, at one portion of said bath, combining all of the oxygen of said substance with said bath, separating the nitrogenous residue from the compound so formed, collecting said residue and treating said bath at another portion thereof with a reagent to eliminate the so combined oxygen therefrom and to liberate the so combined metal, said collected residue being kept apart from the oxygen eliminated in the manner aforesaid.

17. The process of obtaining nitrogen which comprises treating a substance which contains nitrogen and oxygen with a heavy metal to remove the oxygen content of said substance by oxidizing the metal, separating the nitrogenous residue from the oxygen compound so formed, and reacting upon said oxygen compound with a reducing reagent in the presence of a menstruum for one of said substances, at a temperature below 950° C.

18. The process of obtaining nitrogen which comprises treating a substance which contains nitrogen and oxygen with a molten heavy metal to remove the oxygen content of said substance by forming an oxid of such metal, separating the nitrogenous residue from said oxid, and reacting upon said oxid with a reducing reagent while said oxid is held in solution in a menstruum for the same which differs in its chemical composition from said oxid.

19. The process of obtaining nitrogen which comprises treating a substance which contains nitrogen and oxygen with a molten heavy metal to remove the oxygen content of said substance by forming an oxid of such metal, separating the nitrogenous residue from said oxid, and reacting upon said oxid with a reducing reagent while said oxid is held in solution, the oxid menstruum comprising a mixture of fused alkali metal salts.

20. The process of obtaining a gaseous element from a material containing oxygen as one of the constituents thereof, which comprises reacting upon heated metal, capable of being readily oxidized under the conditions of the operation, with the oxygen content of a quantity of said material to form a metallic oxid, separating the element sought from the metallic oxid, dissolving said oxid in a menstruum for the same, at a temperature below 950° C. and regenerating the oxidized metal.

21. The process of obtaining a gaseous element from a material containing oxygen as one of the constituents thereof which comprises reacting upon a heated metal, capable of being readily oxidized under the conditions of the operation, with the oxygen content of a quantity of said material, to form a metallic oxid, separating the element sought from the metallic oxid, and reacting on said oxid with a reducing reagent in the presence of a menstruum from one of the two last mentioned substances, at a temperature below 950° C.

In witness whereof, I subscribe my signature, in the presence of two witnesses.

CHARLES E. ACKER.

Witnesses:
 FRANK E. FOSNAY,
 KENNETH G. ACKERLY.